Patented Feb. 26, 1952

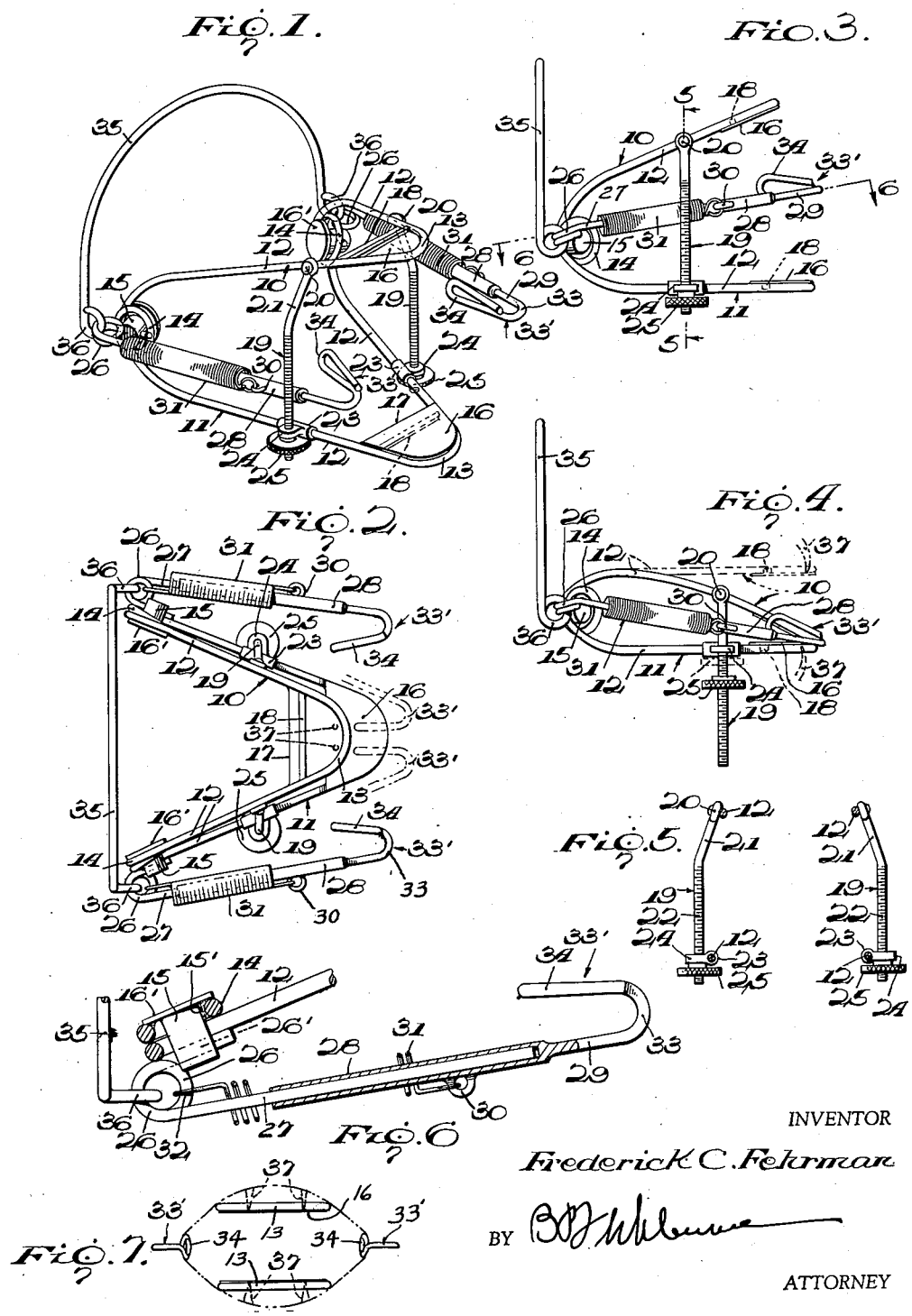

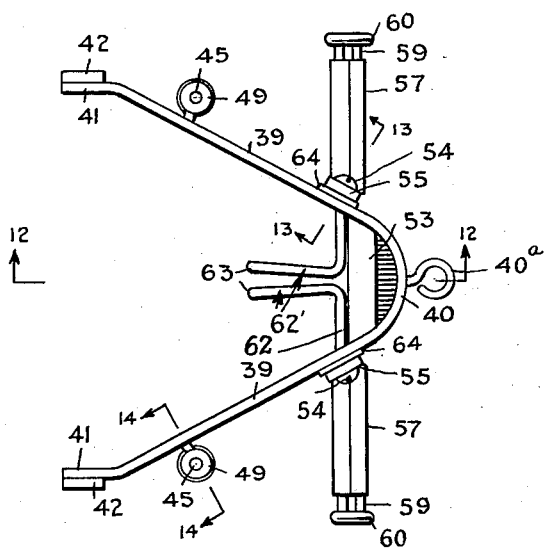
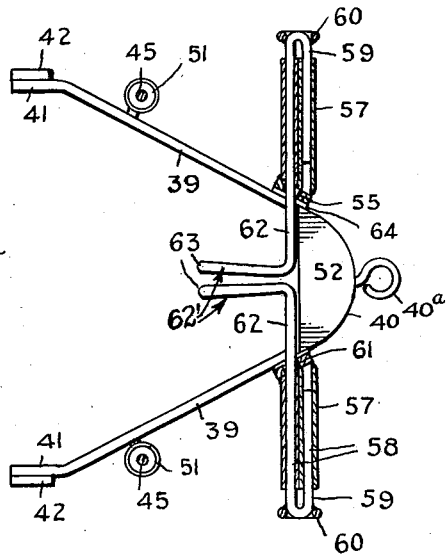
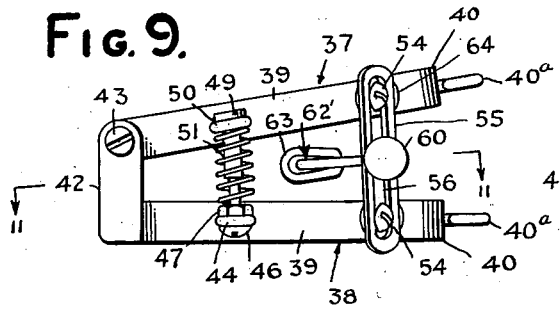
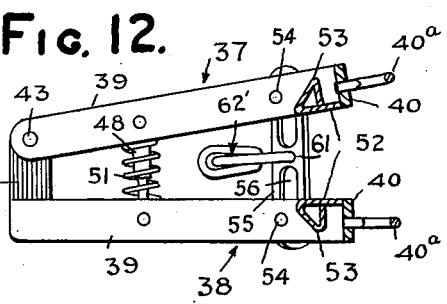
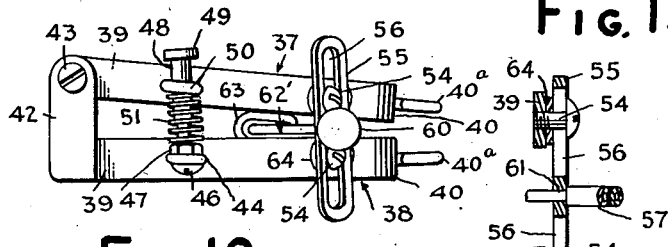
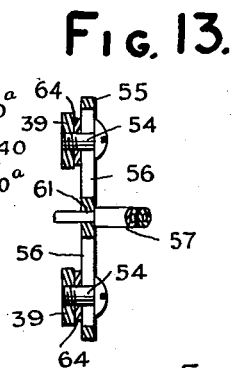

2,587,129

UNITED STATES PATENT OFFICE 2,587,129

ANIMAL MOUTH OPENER

Frederick C. Fehrman, Washington, D. C.

Application March 1, 1951, Serial No. 213,325

6 Claims. (Cl. 128—19)

My invention relates to a mouth opening device for animals.

A primary object of the invention is to provide a mouth opener for small animals, such as chinchillas, which will greatly facilitate working in the mouth, or upon the teeth or adjacent organs of such animals, which are reached through the mouth.

A further object is to provide an animal mouth opener including resilient means for opening or separating the jaws of the animal so that its jaws may have some freedom of movement during the use of the device.

A further object is to provide an animal mouth opener of the above-mentioned character, including means for stretching apart and holding back the loose jowls or cheeks of the animal to further facilitate working within its mouth.

A further object is to provide a mouth opening implement for small animals, having means to positively limit the extent of opening or spreading of the jaws of the device, so that the animal's jaws are not spread apart excessively.

A further object is to provide a device of the above-mentioned character including separate adjustable jowl holding elements which remain in selected adjusted positions by friction.

A still further object of the invention is to provide a device of the above-mentioned character which is simple and compact in construction, sturdy and durable, light weight, and inexpensive to manufacture.

Other objects and advantages of the invention will be apparent during the course of the following description.

In the accompanying drawings, forming a part of this application, and in which like numerals are employed to designate like parts throughout same.

Figure 1 is a perspective view of a mouth opening device embodying my invention, Figure 2 is a plan view of the same, Figure 3 is a side elevation of the device, Figure 4 is a side elevation of the device with its jaws drawn together for insertion into the mouth of the animal, and showing in dotted lines the position of the jaws during use, Figure 5 is a transverse vertical section taken on line 5—5 of Figure 3, Figure 6 is an enlarged central longitudinal section taken on line 6—6 of Figure 3, parts in elevation, Figure 7 is a diagrammatic view showing how the device stretches and holds the animal's jowls, Figure 8 is a plan view of a mouth opener embodying a modified form of the invention, Figure 9 is a side elevation of the same, Figure 10 is a side elevation of the device with its jaws drawn together for insertion into the mouth of the animal, Figure 11 is a substantially horizontal section taken on line 11—11 of Figure 9, Figure 12 is a central vertical section taken on line 12—12 of Figure 8, Figure 13 is a vertical section taken on line 13—13 of Figure 8, and, Figure 14 is a vertical section taken on line 14—14 of Figure 8.

This application is a continuation in part of my pending application, Serial Number 199,035, filed Dec. 4, 1950 and now abandoned.

In the drawings, where for the purpose of illustration are shown preferred embodiments of my invention, attention is directed first to Figures 1 to 7 inclusive, wherein the numerals 10 and 11 designate upper and lower resilient jaws for opening the mouth of a small animal, such as a chinchilla. The jaws 10 and 11 comprise forwardly converging bars or sides 12, Figure 2, integrally joined at their forward ends by arcuate bars or loops 13. The rear ends of the bars 12 are integraly secured to spiral spring coils 14, disposed vertically and formed with the jaws 10 and 11 from a continuous section of spring wire, or the like. The upper and lower jaws 10 and 11 diverge forwardly, Figure 3, and the spring coils 14 bias the jaws toward their spread apart or open positions, Figures 1 and 3. The bars 12 are also resilient, and with the spring coils 14 are adapted to resist the closing of the jaws 10 and 11.

Short anchoring pins or elements 15 are mounted eccentricaly within the spring coils 14, and rigidly secured therein by soldering one of the coils 14 at one point only to each pin 15, as at 15', Figure 6. The remainder of the coils 14 are spaced from the pins 15 and free from solder so that they may be active for spreading apart the jaws 10 and 11. The inner heads 16' of the pins 15 are substantially flush with the inner sides of the bars 12, Figure 2, and the outer ends of the pins 15 project a slight distance laterally outwardly of the bars 12, as shown.

Flat bit plates 16 are soldered or otherwise rigidly secured to the forward ends of the jaws 10 and 11, and preferably to the bottom of the upper jaw 10 and to the top side of the jaw 11, as shown. The marginal edges of the bit plates 16 follow the contours of the forward ends of the jaws 10 and 11, and the bit plates have straight transverse edges 17 at their rear ends, and spaced rearwardly of the arcuate bars 13. Straight transverse ribs or stops 18 are rigidly secured to the top and bottom faces of the upper and lower bit plates 16, respectively, and the ribs 18 are spaced a slight distance forwardly of and parallel to the edges 17. The ribs 18 extend for the full distance between the pairs of bars 12, and preferably have their outer sides flush with the upper and lower sides of the upper and lower jaws 10 and 11.

Means are provided to positively limit and adjust the extent of opening of the jaws 10 and 11. Such means comprises a pair of transversely oppositely disposed vertical screw-threaded adjusting rods 19, arranged near the longitudinal centers of the jaws 10 and 11, and having their upper ends pivotally secured to the outer sides of the upper pair of bars 12, as shown at 20. The upper portions 21 of the screw-threaded adjusting rods 19 are inclined slightly and converge upwardly, so that the vertical screw-threaded portions 22 are spaced laterally outwardly slightly of the lower bars 12, which themselves may be spaced apart a slightly greater distance than the upper bars 12, as shown. Sleeves 23 are slidably mounted upon the lower bars 12 and carry laterally outwardly projecting apertured bosses or eyes 24, rigidly secured thereto, and slidably receiving the adjusting screws 19. Nuts 25 have screw-threaded engagement with the adjusting rods 19 below the eyes 24. With this arrangement, the extent of opening of the jaws 10 and 11 is positively regulated, but the jaws may always close, since the adjusting rods 19 are freely slidable through the eyes 24.

Horizontally disposed spiral spring coils 26 are arranged outwardly of the spring coils 14, and have corresponding ends rigidly anchored in openings formed in the pins 15, outwardly of the spring coils 14, as shown at 26', Figure 6. Longitudinally forwardly extending substantially horizontal arms or rods 27 are integrally secured to the other corresponding ends of the coils 26, and spaced laterally outwardly of the sides of the jaws 10 and 11, Figure 2. The arms 27 are arranged midway between the upper and lower jaws 10 and 11, and converge forwardly, but to a lesser degree than the bars 12, see Figure 2. Elongated sleeves 28 are telescopically slidably mounted upon the rods 27, and the forward ends of the sleeves 28 carry longitudinally forwardly extending shanks 29, rigidly secured thereto and adapted to engage the forward ends of the rods 27 to limit the rearward axial movement of the sleeves 28. Eyes 30 are rigidly secured to the outer sides of the sleeves 28, near and rearwardly of their forward ends, and retractile coil springs 31 surround the arms 27 and sleeves 28 and have their forward ends connected with the eyes 30, and their rear ends connected with the horizontal spring coils 26, as shown at 32.

The shanks 29 form integral parts of inwardly directed hooks 33', having forward rounded ends 33, carrying longitudinally rearwardly extending jowl engaging elements or loops 34, rigidly secured thereto and spaced laterally inwardly of the shanks 29 and substantially parallel therewith. The rear ends of the jowl engaging loops 34 terminate near and rearwardly of the forward ends of the sleeves 28, and the loops 34 are disposed in substantially vertical planes, as best shown in Figures 1 and 3. The hooks 33' are thus disposed midway between the forward ends of the jaws 10 and 11, and the forward ends 33 of the hooks terminate substantially at the arcuate ends 13 of the jaws. In their free positions, the hooks 33' are spaced laterally outwardly of the forward ends of the jaws 10 and 11 as shown in Figure 2. The spring coils 26 bias the arms 27 to the positions shown in Figure 2, and when the arms 27 and hooks 33' are forced laterally inwardly to the dotted line positions of Figure 2 and released, they will return automatically to the positions shown in full lines in Figure 2. The retractile springs 31 likewise bias the sleeves 28 and hooks 33' axially rearwardly, with the shanks 29 engaging the forward ends of the arms 27.

I provide an inverted U-shaped bail or hanger loop 35 for engagement over the neck of the animal rearwardly of its head, to support the rear end of the mouth opening device and prevent the animal from backing out of the same. The lower ends of the bail 35 are pivotally secured at 36 to the spring coils 26, and the bail is freely swingable vertically.

In the use of the device, as illustrated by Figures 1 to 7 inclusive, the forward ends 13 of the jaws 10 and 11 are grasped between the fingers and drawn together or closed as shown in full lines in Figure 4. The bit plates 16 are now introduced rearwardly into the mouth of the animal, until the transverse ribs 18 pass rearwardly of the animal's front teeth 37. The jaws 10 and 11 are now released, and the bit plates 16 engage the teeth 37 and the animal's jaws are forced open, as shown in dotted lines in Figure 4. The teeth 37 are locked forwardly of the ribs 18 and cannot slip from the rear edge of the bit plates 16. The head of the animal is disposed inwardly of the diverging bars 12 of the upper and lower jaws 10 and 11, and the pins 15 are disposed upon opposite sides of the animal's head. The bail 35 engages over the head or neck of the animal, and prevents it from withdrawing its head rearwardly. The nuts 35 are adjusted to provide the proper degree of opening or spreading of the resilient jaws 10 and 11, so that the animal's mouth will not be stretched open too far. The mouth is held open the desired extent, and the animal will have some freedom of movement of its jaws in the closing direction, due to the resiliency of the coils 14 and bars 12. However, when the animal's jaws are relaxed, the device will hold its mouth open.

When the animal's mouth is thus held open by the device, the hooks 33' are drawn longitudinally forwardly, and the arms 27 are simultaneously forced laterally inwardly to the dotted line positions shown in Figure 2. The hooks 33' are now brought into engagement with the loose jowls or cheeks of the animal and the vertical loops 34 are disposed inwardly of the jowls. The hooks 33' and arms 27 are now released, and the arms 27 spring laterally outwardly toward the full line positions of Figure 2, and the coil springs 31 shift the sleeves 28 and hooks 33' longitudinally rearwardly toward their full line positions. The hooks 33' thus stretch the jowls of the animal laterally outwardly and retract the same for fully exposing the teeth 37, as shown diagrammatically in Figure 7. I contemplate making the device without the screw-threaded adjusting rods 19.

In Figures 8 to 14 inclusive, I have shown a modified form of the device, wherein the numerals 37 and 38 designate first and second rigid jaws for opening the mouth of the small animal. The jaws 37 and 38 are formed from bars or bands, bent to provide forwardly converging sides 39, integrally joined at their forward ends by arcuate bars or portions 40. The rear ends of the sides 39 carry short parallel longitudinal extensions 41, terminating in lateral alignment, and the extensions 41 of the jaw 38 carry upstanding vertical plates or lugs 42, rigidly secured thereto and disposed at the outer sides of the extensions 41. The extensions 41 of the jaw 37 are pivotally secured as at 43 to the upper ends of the upstanding plates 42 and these plates maintain the rear ends of the jaws spaced apart a fixed distance. The jaws 37 and 38 are swingable toward and away from each other, due to the pivotal connection of the jaw 37 with the plates 42. The jaws 37 and 38 are open at their rear ends, as shown, so that the animal's head may be placed between the sides 39. Finger engaging eyes or loops 40ª are rigidly secured to the forward ends 40 and project longitudinally forwardly thereof to aid in drawing the jaws 37 and 38 together.

Eyes 44 are rigidly secured to the sides 39 of the jaw 38, near and forwardly of the plates 42, and the eyes 44 project laterally outwardly of the sides 39 and are disposed horizontally, Figure 14. Upwardly directed vertical screws 45 have their heads 46 engaging the lower sides of the eyes 44, and nuts 47 are mounted upon the screws 45 and locked against the upper sides of the eyes 44 for fixedly securing the screws to the eyes. The screws 45 have tubular adjusting nuts 48 mounted thereon and provided at their upper ends with enlarged heads 49 forming stops. The tubular nuts 48 extend slidably through eyes 50, rigidly secured to the sides 39 of the jaw 37 and arranged in aligment with the eyes 44. The heads 49 are arranged above the eyes 50 and contact such eyes for limiting the opening or spreading of the jaws 37 and 38. The extent of opening of the jaws may be adjusted by turning the tubular nuts 48 upon the screws 45, and in all positions of the nuts 48, the heads 49 positively limit the openings or spreading apart of the jaws. The nuts 48 are normally adjusted during the use of the device so that the jaws 37 and 38 diverge forwardly as shown in Figures 9 and 12 when they are released. Expansible coil springs 51 surround the screws 45 and tubular nuts 48 between the eyes 50 and nuts 47, and these springs serve to bias the jaws 38 and 37 to their open or spread apart positions. The jaws are freely swingable together at their forward ends, as shown in Figure 10, and when released the jaws will return automatically to their spread apart positions of Figure 9.

Flat bit plates 52 are soldered or otherwise rigidly secured to the forward ends of the jaws 37 and 38 and perferably to the bottom side of the jaw 37 and to the upper side of the jaw 38 as shown in Figure 12. The marginal edges of the bit plates 52 follow the contours of the forward ends of the jaws 37 and 38 and the bit plates are bent upwardly at their rear ends for forming transverse ribs or abutments 53, integral therewith and projecting above and below the bit plates 52 of the jaws 37 and 38 respectively. The transverse ribs 53 extend for the full distance between the sides 39 of the respective jaws, and the ribs 53 spaced a slight distance longitudinally rearwardly of the rounded ends 40, as shown. The ribs 53 serve the same purpose as the transverse ribs 18 described in connection with the first form of the invention.

Rigidly secured to the jaw sides 39 near the forward ends of the jaws 37 and 38 are pairs of headed guide pins 54 which project laterally outwardly of the sides 39, as shown. Substantially vertical links or plates 55 extend between the jaws 37 and 38 and are provided with pairs of longitudinal slots 56, slidably receiving the guide pins 54. The guide pins 54 have a free or loose fit within the slots 56, so that the links 55 will not interfere with the free opening and closing of the jaws, and the guide pins 54 serve to secure the links 55 to the jaws. The links 55 are provided at their longitudinal centers and substantially midway between the jaws 37 and 38 with laterally outwardly extending opposed horizontal guides 57, rigidly secured thereto by soldering or the like. These guides 57 are positioned substantially adjacent to the transverse ribs 53, as shown, and the outer ends of the guides terminate substantially in longitudinal alignment with the upstanding plates 42, Figure 8. The guides 57 are parallel to the transverse ribs 53, and each guide has a pair of parallel passages or bores 58 extending longitudinally therethrough, for receiving and guiding opposed U-shaped rods or arms 59, equipped at their outer ends with small projections or knobs 60 to facilitate operating the same. The U-shaped rods 59 are slidable longitudinally within the bores 58, and have frictional engagement therewith, so that they will remain in selected adjusted positions. The innermost side 62 of each U-shaped rod 59 extends slidably through an opening 61 formed in the link 55, at the longitudinal center of the same and inwardly of the sides 39 of the jaws as shown. Rearwardly directed hook elements 62' are integrally secured to and carried by the innermost sides 62, and formed to provide opposed substantially parallel longitudinally rearwardly extending jowl engaging elements or loops 63, similar to the loops 34. The loops 63 lie in substantially vertical planes, as shown, and the rear ends of the loops 63 terminate near the longitudinal centers of the jaws 37 and 38. The outward movement or separation of the adjustable hook elements 62' is limited by the contact of these elements with the links 55, when the U-shaped rods 59 are pulled outwardly. The hook elements 62' are shiftable together to substantially contacting opposed positions at the transverse center of the device, as shown in Figures 8 and 11. If desired, washers 64 may be mounted upon the guide pins 54 between the links 55 and sides 39.

In use, the device is employed in generally the same manner as the device constituting the first form of the invention. The forward ends of the jaws 37 and 38 are drawn together and the bit plates 52 are introduced into the animal's mouth so that its front teeth may engage between the transverse ribs 53 and ends 40. The jaws 37 and 38 are then released, and the animal's mouth is forced open for the desired extent, as controlled by the adjustment of the tubular nuts 48. The loops 63 at this time are arranged in their innermost positions as shown in Figure 8, and projecting into the mouth of the animal. The knobs 60 are now grasped and pulled outwardly for separating the loops 63, and these loops will engage and spread apart the jowls or cheeks of the animal in a manner similar to that illustrated diagrammatically in Figure 7. The jowl holding loops 60 will remain in the selected adjusted positions due to the frictional engagement of the U-shaped rods 59 in the bores 58.

It is to be understood that the forms of the invention herewith shown and described are to be taken as preferred examples of the same, and that various changes in the shape, size and arrangement of parts may be resorted to, without departing from the spirit of the invention or the scope of the subjoined claims.

Having thus described my invention, I claim:

1. A device for holding open an animal's mouth comprising resilient jaws including bit parts engageable within the mouth of the animal to open the mouth, longitudinal resilient arms secured to the device near the sides of the resilient jaws, hook elements slidably engaging the longitudinal resilient arms and projecting forwardly thereof and adapted to engage and hold the animal's jowls, and spring means connected with the hook elements and urging them longitudinally rearwardly.

2. A device for opening an animal's mouth comprising upper and lower jaws including sides between which the animal's head is positioned, bit means carried by the forward ends of the jaws for engagement in the animal's mouth, spring means connecting the jaws and resiliently spreading them apart, longitudinal arms secured to the jaws near their rear ends and extending forwardly and spaced laterally of the sides of the jaws, sleeves telescopically slidably mounted upon the longitudinal arms, holding elements secured to the sleeves and adapted to engage the jowls of the animal for stretching the same, and coil springs connecting the sleeves and longitudinal arms and serving to draw the holding elements longitudinally rearwardly.

3. A device for opening an animal's mouth comprising upper and lower forwardly diverging jaws including sides to be arranged exteriorly of the mouth of the animal, bit elements secured to the upper and lower jaws near their forward ends and adapted to engage in the animal's mouth, spring coils connecting the upper and lower jaws and serving to bias them apart for holding the animal's mouth open, hook elements arranged near the sides of the device and adapted to engage and hold the animal's jowls, spring coils connected with the hook elements for biasing them laterally outwardly of the sides of the upper and lower jaws, and adjustable means connecting the upper and lower jaws to limit the extent of opening of the jaws.

4. A device for holding open an animal's mouth comprising first and second jaws including forwardly converging sides and forward ends connecting the sides of each jaw, the rear ends of the jaws being open for receiving the head of the animal, means hingedly connecting the first and second jaws near their rear ends so that their forward ends are shiftable toward and away from each other, adjustable resilient means connected with the jaws for urging them apart and limiting their movement away from each other, transverse ribs carried by the jaws near their forward ends for engagement rearwardly of the front teeth of the animal when the ribs are inserted into the mouth of the animal, pairs of projections carried by the sides of the jaws near the forward ends thereof, slotted links extending between the first and second jaws and slidably receiving the pairs of projections for connecting the jaws and links and permitting the jaws to operate freely, transverse guides secured to the links and extending beyond the sides of the jaws, and transversely adjustable jowl holding elements connected with the transverse guides for movement to selected adjusted positions along the same.

5. A device for holding open an animal's mouth comprising upper and lower jaws having bit parts insertable into the mouth of the animal, spring means connecting the upper and lower jaws and urging them apart to force open the animal's mouth, and a pair of laterally oppositely disposed hook elements carried by the device and movable transversely of the upper and lower jaws for a substantial distance, the hook elements being adapted to engage the jowls of the animal for spreading them apart while the device holds open the animal's mouth.

6. A device for holding open an animal's mouth comprising upper and lower jaws including transverse bit parts for insertion into the mouth of the animal, spring means connecting the upper and lower jaws and urging them apart to force open the animal's mouth, and a pair of laterally oppositely disposed hook elements carried by the device and arranged between the upper and lower jaws of the device, said hook elements being longitudinally rearwardly directed so that they may engage the jowls of the animal substantially midway between the upper and lower jaws and hold the jowls while the animal's mouth is open, the hook elements being adjustable transversely of the upper and lower jaws for substantial distances.

FREDERICK C. FEHRMAN.

REFERENCES CITED

The following references are of record in the file of this patent:

UNITED STATES PATENTS

| Number | Name | Date |
| --- | --- | --- |
| 20,905 | Thomas | July 13, 1858 |
| 442,180 | Halfpenny | Dec. 9, 1890 |
| 467,658 | Cameron et al. | Jan 26, 1892 |
| 574,591 | Walker | Jan. 5, 1897 |
| 853,031 | Prentis | May 7, 1907 |
| 1,130,346 | Swales | Mar. 2, 1915 |